March 12, 1968  H. BERGER  3,373,254
TIME SWITCHING DEVICE FOR CONTROLLING A HEATING SYSTEM
Filed Jan. 24, 1966  3 Sheets-Sheet 1

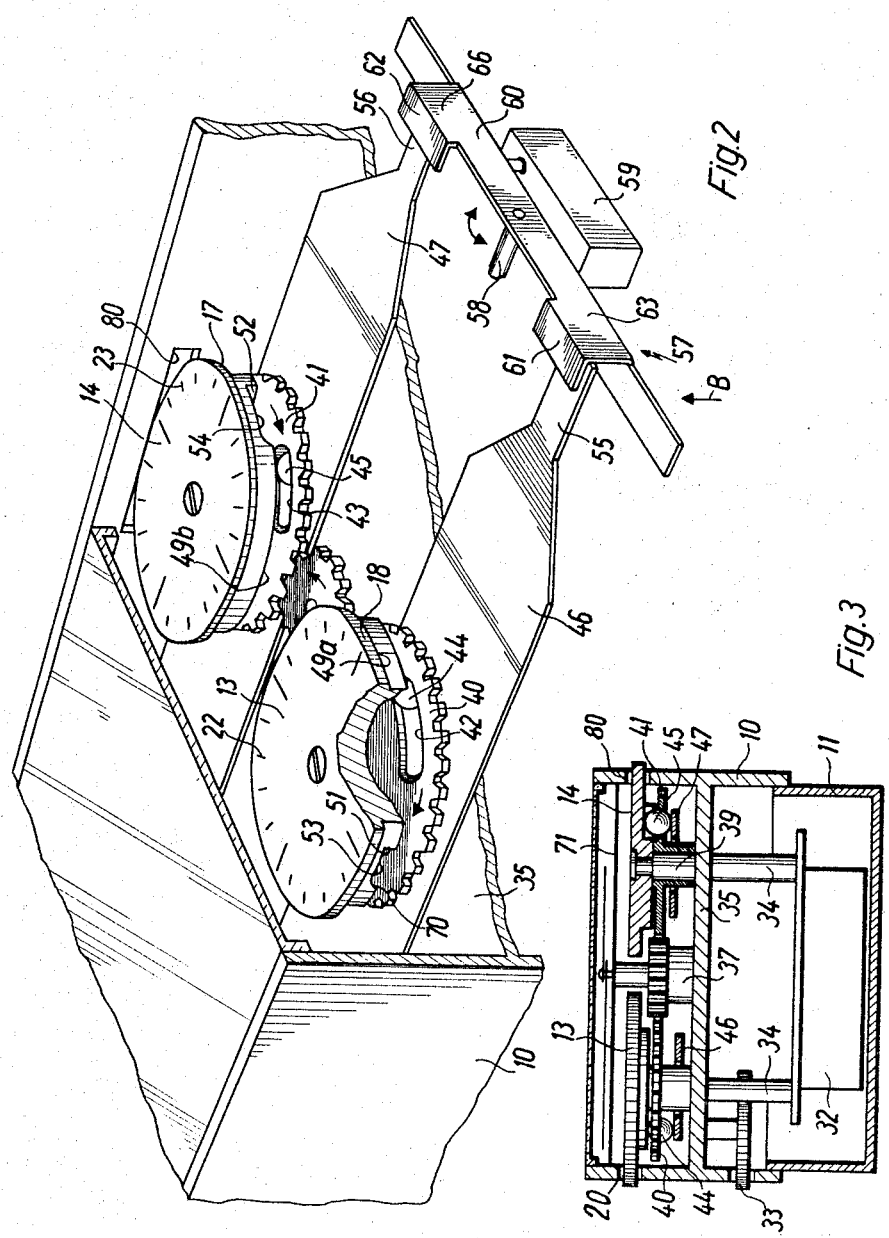

United States Patent Office 3,373,254
Patented Mar. 12, 1968

3,373,254
TIME SWITCHING DEVICE FOR CONTROLLING A HEATING SYSTEM
Hans Berger, Schonaich, Germany, assignor, by mesne assignments, to Zentra Albert Burkle Kommanditgesellschaft, Schonaich, Germany, a limited partnership
Filed Jan. 24, 1966, Ser. No. 522,486
Claims priority, application Austria, Jan. 22, 1965, A 537/65
7 Claims. (Cl. 200—38)

ABSTRACT OF THE DISCLOSURE

A time switching device for controlling a central heating system in accordance with a daily, weekly or monthly program including two indexing devices. Each device comprises a sprocket wheel sandwiched between a disk having a flange with a cam track on the radial surface thereof and a leaf spring and the sprocket wheel is provided with a slot for receiving a ball which is urged into contact with the cam track by the leaf spring. A recess is provided in the cam track and a sprocket wheel is rotated relative to the disk by a clockwork mechanism and when the ball moves into the recess the leaf spring is displaced to trip an electric switch.

One device activates the heating circuit and the other deactivates the heating surface with each of the disks being adjustable to regulate the time interval between the successive operation of the two devices.

---

The present invention relates to a time switching device and more particularly to time switching devices for controlling central heating systems in accordance with a daily, weekly or monthly programme.

One particular object of the invention is to construct a time switching device which can be set by housewives without difficulty.

A further object of the invention is to provide a time switching device whose setting as regards times of operation can easily be read.

A still further object of the invention is to provide a time switching device which is simple to construct and reliable in operation.

Yet a further object of the invention is to provide a time switching device in which switching can take place at small time intervals.

The present invention comprises, in combination, a pair of electrical contacts; clock drive means; and time switching means including: cam sensing means, two co-axial rotary parts of which one has a cam face and the other is adapted for moving the cam sensing means about the common axis of the two rotary parts along a path in which the cam sensing means is capable of engaging the cam face of one of the two rotary parts, one of the two rotary parts being coupled with the clock drive means so as to be rotated thereby, and coupling means arranged to be actuated by the cam sensing means and when so actuated to actuate the contacts abruptly.

Preferably the cam sensing means is a rolling body such as a ball and it moves in a direction parallel to the axis of the two rotary parts when it is actuated by the cam face. Preferably the latter has an angular edge with an angle equal to not more than substantially 90°.

Preferably, also one of the rotary parts serving for moving the cam sensing means has a slit in which the sensing means lies, with the slit being elongated in a circumferential direction about the axis of the rotating parts.

The coupling means can comprise a resilient strip pressing the cam sensing means against the rotary part with the cam face. Alternatively, the coupling means can include a strip which is pivoted at one end and is acted upon by a spring at the other.

In two preferred embodiments of the invention, two such time switching means are employed, with one of the rotary parts in each switching means being driven by the same clock drive means and each of the cam switching means being coupled with the same pair of contacts.

In a case where two such switching means are employed, the rotary parts can either have a common axis of rotation or can rotate about two separated but parallel axes. In the former case, the two rotary parts provided with cam faces can be of integral construction, with the cam faces constituting opposite radial faces of the construction.

In the case of a combination employing two time switching means, the coupling means are preferably adapted to exert different forces on a seesaw lever coupled with the electrical contacts, with the force exerted by one of the coupling means being capable of actuating the electrical contacts against the action of the other coupling means.

Further features of the invention will be gathered from the following description of two embodiments of it, referring to the attached drawings.

FIG. 2 is a further view of the timing device shown in FIG. 1 in partial section.

FIG. 3 is a section on the line 3—3 marked on FIG. 1.

Figure 1:
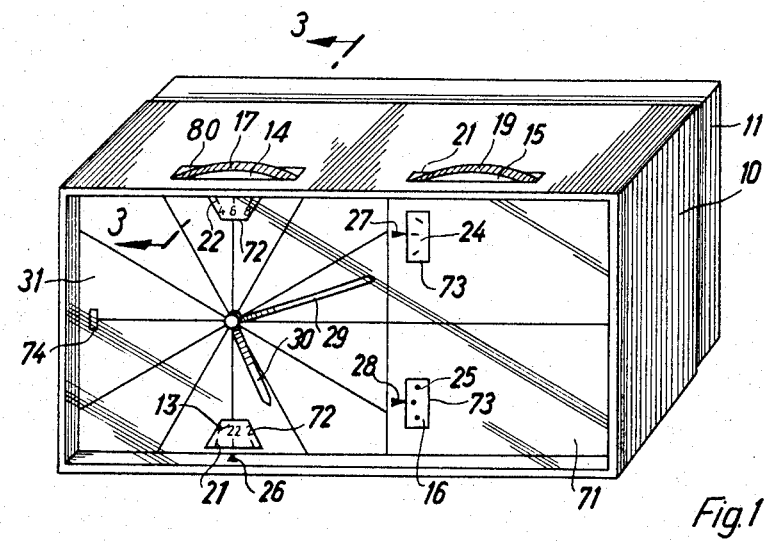
FIG. 1 is a diagrammatic view of a timing device in accordance with the invention.

The timing device constituting the first embodiment of the invention shown in FIGS. 1 and 3 is adapted for bringing about a daily lowering and raising of the temperature of a central heating system, for example for controlling room temperatures. However, the timing device instead of being adapted for bringing about daily changes in temperature can be constructed for bringing about changes over longer periods, for instance over weeks or months. In this case, instead of being calibrated in hours, it will be calibrated in days or weeks.

Referring now more particularly to FIGS. 2 and 3, it will be seen that the timing device comprises a main housing part 10 and a further housing part 11. In some cases the timing device may be arranged so that the housing part 10 is above the housing part 11. In the housing there are mounted rotary parts 13 and 14 having cam faces which will be referred to as cams, and rotary discs 15 and 16. In FIG. 1 it will be seen that the top part of disc 15 protrudes through a slot 21 in the top of the housing and is provided with a knurled edge 19. Disc 15 serves for setting the temperature of the heating system when switch 59 (see FIG. 2) is de-activated as will be explained in more detail below. The disc 16 is similar and owing to the angle of the view chosen for FIG. 1 only part of its surface can be seen through window 73 and serves for setting the temperature when switch 59 is activated. The disc protrudes through a slot in the under part of the housing similar to the slot 21. Similarly the rotary cams 13 and 14 have knurled edges 18 and 17 respectively which protrude through slots 80 and 20 in the housing.

The cam 13 serves for setting the time at which the daily temperature lowering is to end while the cam 14 serves for setting the time at which the daily temperature lowering is to begin. The position of the cams 13 and 14 and the discs 15 and 16 can be read on scales 22, 23, 24 and 25, through windows 72 and 73 and are provided with index marks such as 26, 27 and 28 mounted on the face 31 of the timing device.

Furthermore, there are a pair of clock hands 29 and 30 of conventional construction which are driven by a clock drive means in the form of a conventional synchronous motor indicated at 32 in FIG. 3. This clock drive means includes a conventional step down gearing. Reference numeral 33 also shown in FIG. 3 is used to indicate a means for setting the position of the hands of the clock. The clock drive means 32 is attached to an intermediate wall or partition 35 of the housing part 10 by means of bolts and distance pieces such as 34. Besides being adapted to drive the two hands 29 and 30 of the clock, the drive means also rotates a hollow shaft 37 concentric with the shafts of the hands which carries a pinion meshing with teeth provided on rotary parts 40 and 41. The ratio of this drive is so chosen that the rotary parts 40 and 41 each perform one revolution in 24 hours. The rotary parts 40 and 41 are journalled, in common with the rotary cams 13 and 14, on fixed pins such as 39. The cams 13 and 14 are mounted on the pins with a certain degree of friction which can however be overcome by hand by pushing with the fingers against their knurled edges 17 and 18.

The rotary parts 40 and 41 have circumferentially extending slits 42 and 43 which serve to guide cam sensing means in the form of rolling bodies, such as balls 44 and 45. These balls 44 and 45 are pressed by strip springs 46 and 47 against cam faces 49a and 49b of the two cams 13 and 14 in such a manner that they follow the profiles of the cam faces. The position of the strip springs 46 and 47 is therefore determined by the position of the balls 44 and 45 in directions parallel to the axes of the two cams 13 and 14. The balls continuously rotate since the rotary parts 40 and 41 are rotated by the pinion on the part 37. As soon as one of the balls 44 or 45 comes to sharp edge 51 or 52 of a depression 53 or 54 in the corresponding cam 13 or 14, the ball is pushed abruptly into the depression 53 or 54 by the pressure of the respective spring 46 or 47. This is because the edges 51 and 52 are angular and preferably have an angle equal to not more than substantially 90°.

The two springs 46 and 47 are, in this embodiment of the invention, substantially parallel to each other and serve as coupling means between the balls 44 and 45 and a seesaw or rocking lever generally denoted 57. For this purpose, front ends 55 and 56 of the respective strip springs 46 and 47 fit under projecting lugs 61 and 62 on central 60 of the seesaw lever 57. The lever is pivoted on a pin 58. In the lever 57 is coupled with a bi-stable switch 59, that is to say a conventional switch having a pair of contacts and being provided with spring loading means so designed that during the movement of the switch the force provided by the spring loading means changes in direction so that the spring is constantly urged into either one terminal position or the other.

In the position of the device shown in FIG. 2, left arm 63 of the lever 57 is in the lower position while right arm 66 is raised and as a result, the switch 59 is in the position corresponding to a temperature lowering. The precise connections of the switch 59 with the rest of the control system for the central heating system is not shown as it is not relevant to the present invention. As soon as the rotary part 40 has turned sufficiently to bring the ball 44 to the edge 51 of the recess 53 in the cam 13, the ball snaps abruptly into the recess owing to the pressure of the strip spring 46 exerted thereupon so that the end 55 of the strip spring moves abruptly upwardly throwing the left hand end 63 of the seesaw lever upwardly as indicated by arrow B and throwing the right hand end 66 of the lever 57 downwardly. As a result, the switch 59 is brought into the position in which a rise in temperature is caused to begin. On continued rotation of the rotary part 40, the ball 44 is rolled up the sloping edge 70 of the recess 53 so that the strip spring 46 with its end 55 is moved again downwardly into its original position. However, this downward movement of the end 55 does not influence the position of the lever 57. The lever 57 is in fact only actuated again when the ball 45 arrives at the edge 52 of the recess 54 in the cam 14 and owing to the pressure of the respective strip spring 47 is abruptly sprung upwardly into the recess 54. As a result, the end 56 knocks the right hand end 66 of the seesaw lever 57 again upwardly so that the lever assumes the position shown in FIG. 2.

The force exerted by the spring 47 which constitutes a coupling means between the ball 45 and the switch 59 is capable of swinging over the lever 57 in an anticlockwise direction about the pivot pin 58 against the action of the spring 46 and thereby actuating the switch 59. This would happen if the recess 53 was slightly ahead of the recess 54 in the cam 14 so that first of all the lever 57 would be swung in a clockwise direction as shown by arrow B and then, while the ball 44 was still in the recess 53 in the cam 13, the ball 45 reached the edge 52 of the recess 54 in the cam 14 and consequently snapped into this recess releasing the spring 47 and allowing it to come into contact with the lug 62 which would be held in its lower position by the raised spring 46. However owing to the greater force of the spring 47, the seesaw lever 57 would be turned back in such a manner that the lug 62 would be raised and the lug 61 would be lowered thus lowering the spring 46.

The advantage of such an arrangement is that a switching over from one position of the switch 59 to the other position can be arranged to occur, i.e. by setting the cams 13 and 14, within a very short interval of time. The interval of time is not determined by the time taken by a ball to travel from one end of the recess in a cam to the other end as would be the case if the coupling means, i.e. the springs 46 and 47, were of equal strength.

It will be noted that the breadth of the strip springs 46 and 47 underneath the rotary parts 40 and 41 is at least equal to the diameter of the paths of the balls 44 and 45 about the axes of the rotary parts.

On referring to FIG. 1 it will be noted that the face 31, 71 of the device is not only provided with windows such as 72 and 73 elongated in the direction of the scales 22–25 to be viewed therethrough, but is also provided with a window 74 through which the position of the rocking or seesaw lever 57 can be seen. In this manner, the position of the switch 59 is discernable.

Figure 4:
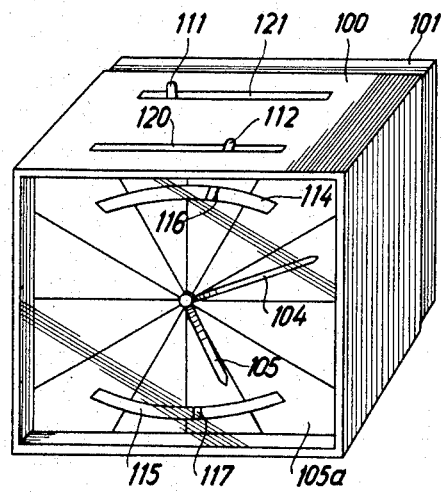
FIG. 4 is a perspective view of a further timing device embodying the invention.
Figure 6:
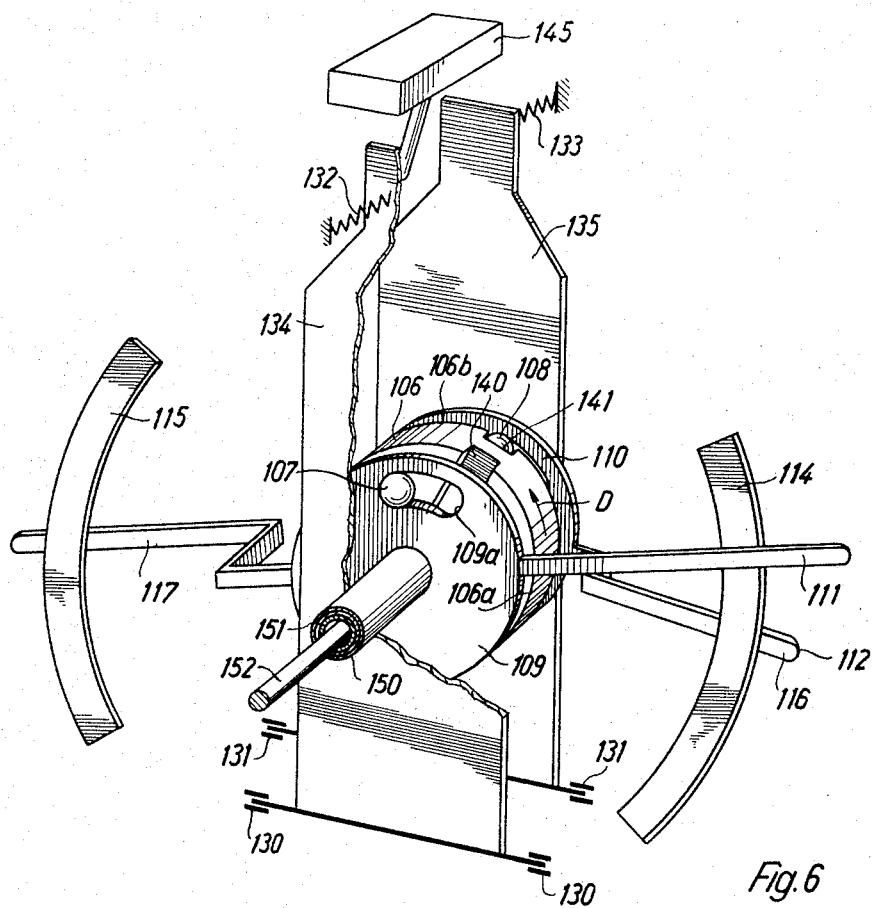
FIG. 6 is a diagram of part of the mechanism of the timing device shown in FIGS 4 and 5.
Figure 5:
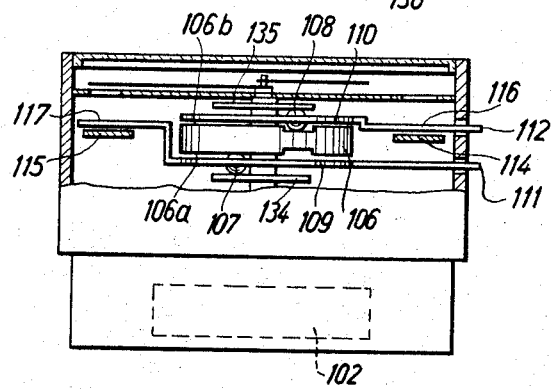
FIG. 5 is a partial section of the timing device shown in FIG. 4 looking in the direction of arrow A marked in FIG. 4.

The further embodiment of the invention shown in FIGS. 4, 5 and 6 is also provided with means for adjusting the lower and higher temperatures set but these means are not illustrated or described. The housing of the device is made up of a part 100 and a further part 101. In the housing, the clock drive means is mounted and is denoted 102 (see FIG. 5). The clock drive means again includes a step down gearing turning clock hands 104 and 105 in front of a clock face 105a. Moreover, the clock drive means rotates a double rotary cam 106 with two cam faces 106a and 106b. The speed of rotation of this double rotary cam construction is one revolution in 24 hours. Balls 107 and 108 serve as cam sensing means and are mounted in slots 109a in rotary parts 109 and 110 co-axial with the double cam 106 which rotates in the direction denoted by arrow D. However, as distinct from the first embodiment of the invention, the rotary parts 109 and 110 are not caused to rotate as was the case with the slotted parts 40 and 41, since the double cam 106 rotates. The parts 109 and 110 can be set by levers 111 and 112 against a frictional force which is sufficient to prevent the same being rotated by the rotation of the cam 106. The positions of rotation of the two rotary parts 109 and 110 can be read from scales 114 and 115 which are fixed to the housing. For this purpose one lever 112 is arranged to serve simultaneously as an indicator or pointer 116 co-operating with the scale 114 while the lever 111 is arranged to move a pointer or indicator 117 also fixed to the rotary part 109 co-operating with the scale 115. The levers 111 and 112 protrude through slots 120 and 121 in the top of the housing as shown in FIG. 4.

The balls 107 and 108 are pushed against the cam faces of the cam 106 by coupling means which include levers in the form of strips 134 and 135, respectively pivoted at 130 and 131, and acted upon by compression springs 132 and 133. Thus, when one of two recesses 140 and 141 comes opposite the respective 107 or 108, the ball is pressed into the recess and the respective strip 134 is thrown over. The throwing over of the strip takes place in an abrupt manner since the edge of the recess 140 or 141 is sharp. The movement of the strip 134, 135 throws over the switch 145 which is similar in construction to the switch 59 previously described and is connected so as to bring about a lowering or raising of the temperature of a central heating system.

The drive of the cam 106 and the two clock hands 104 and 105 is ensured by concentric shafts which are indicated in FIG. 6 at 150, 151 and 152, and the shaft 150 is used to drive the cam 106.

In the position of the mechanism shown in FIG. 6, the ball 108 has been sprung into the recess 141 of the cam face 106b so that the switch 145 is moved into the position shown. On further rotation of the cam in the direction of the arrow D, the ball moves out of the recess 141 since the recess is similar in construction to the recesses 53 and 54 earlier described. The switch is moved over into the other position when the recess 140 reaches the ball 107 so that the strip 134 is switched over. The process is then repeated periodically every 24 hours.

While two specific embodiments of the invention have been described in detail, it is to be understood that this has only been done so that those skilled in the art may take full advantage of the invention and the scope of the monopoly which is sought is to be defined by the gist and spirit of the following claims.

I claim:

1. In a time switching device for controlling a heating system and which device is provided with drive means, a switch and switch actuating means for actuating the switch at predetermined intervals, the improvement comprising indexing means driven by said clock drive means and including a first rotary part having a cam surface with a recess, a second rotary part coaxial with said first rotary part and having a guide member, a rolling body located in said guide member, rolling body actuating means located on the side of said rotary part opposite said first rotary part for urging said rolling body against said cam surface whereby, when said second rotary part is rotated relative to said first rotary part, said rolling body is moved into said recess to displace said rolling body actuating means and thereby actuate said switch actuating means.

2. The time switching device as claimed in claim 1 wherein said rolling body actuating means is a leaf spring resiliently urged into contact with said rolling body.

3. The time switching device as claimed in claim 1 including two indexing means in which the first and second rotary parts of one indexing means and the first and second rotary parts of the other indexing means have a common axis and the first rotary part of one indexing means is integral with the first rotary part of the other indexing means.

4. The time switching device as claimed in claim 1 including two indexing means in which the axis of the first and second rotary parts of one indexing means is parallel to but spaced apart from the axis of the first and second rotary parts of the other indexing means, a pair of electrical contacts a seesaw lever connecting the pair of electrical contacts with the rolling body actuating means of one indexing means and the rolling body actuating means of the other indexing means.

5. The time switching device as claimed in claim 4 in which one of said rolling body actuating means is adapted to exert a greater force on said seesaw lever than said other rolling body actuating means to thereby actuate the electrical contacts against the action of the other rolling body actuating means.

6. The time switching device as claimed in claim 3, including a housing provided with a window, and means for indicating the position of a rotary part for moving a rolling body.

7. The time switching device as claimed in claim 1 including two indexing means in which the axes of the two pairs of rotary members are spaced parallel to each other and in which manual adjusting means is secured to each first rotary part of said two pairs of rotary members, with said adjusting means being in the form of a disc, part of which is arranged to project through slots provided in a side wall of a housing.

References Cited

UNITED STATES PATENTS

| | | | |
|---|---|---|---|
| 2,599,234 | 6/1952 | Clark et al. | 200—38 X |
| 2,770,974 | 11/1956 | Jacobs | 74—54 |
| 3,113,465 | 12/1963 | Hoop et al. | 200—38 X |
| 3,188,503 | 6/1965 | Hendry | 200—38 X |
| 3,320,375 | 5/1967 | Aldrich et al. | 200—38 X |

FOREIGN PATENTS 683,540   12/1952   Great Britain.

BERNARD A. GILHEANY, *Primary Examiner.*

H. SPRINGBORN, F. E. BELL, *Assistant Examiners.*